United States Patent
Oda

(10) Patent No.: US 10,198,240 B2
(45) Date of Patent: *Feb. 5, 2019

(54) POSITION INFORMATION PROVIDING DEVICE, POSITION INFORMATION PROVIDING METHOD, POSITION INFORMATION PROVIDING SYSTEM, AND PROGRAM

(71) Applicant: SONY CORPORATION, Tokyo (JP)

(72) Inventor: Mizuho Oda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 227 days.

This patent is subject to a terminal disclaimer.

(21) Appl. No.: 15/163,402

(22) Filed: May 24, 2016

(65) Prior Publication Data

US 2016/0266869 A1    Sep. 15, 2016

Related U.S. Application Data

(63) Continuation of application No. 14/606,724, filed on Jan. 27, 2015, now Pat. No. 9,361,858, which is a
(Continued)

(30) Foreign Application Priority Data

Sep. 28, 2010  (JP) ................. 2010-217526

(51) Int. Cl.
*G06F 3/16*    (2006.01)
*G09G 5/14*    (2006.01)
(Continued)

(52) U.S. Cl.
CPC ........... *G06F 3/165* (2013.01); *G01C 21/367* (2013.01); *G06F 3/04817* (2013.01);
(Continued)

(58) Field of Classification Search
CPC ................ G01C 21/26; G01C 21/3667; G01C 21/3644; G01C 21/3691; G01C 21/3632;
(Continued)

(56) References Cited

U.S. PATENT DOCUMENTS 5,633,993 A * 5/1997 Redmann ................ G06F 3/011
345/419
7,855,935 B1   12/2010 Lauder et al.
(Continued)

FOREIGN PATENT DOCUMENTS

JP   2001-174538    6/2001
JP   2010-152107    7/2010

OTHER PUBLICATIONS

Combined Chinese Office Action and Search Report dated Jun. 2, 2015 for Chinese Patent Application No. 201110264397.1 and English translation thereof.

*Primary Examiner* — Haixia Du
(74) *Attorney, Agent, or Firm* — Xsensus LLP

(57) ABSTRACT

A position information providing device includes a display control portion which controls, based on sound position information showing sound data transmission positions, the display of a map display screen where icons showing the sound data transmission positions are superimposed on a map.

16 Claims, 14 Drawing Sheets

Related U.S. Application Data continuation of application No. 13/207,729, filed on Aug. 11, 2011, now Pat. No. 8,970,620.

(51) Int. Cl.
*G01C 21/36* (2006.01)
*G06T 11/60* (2006.01)
*G06F 3/0481* (2013.01)

(52) U.S. Cl.
CPC ............ *G06T 11/60* (2013.01); *G09G 5/14* (2013.01); *G06T 2200/24* (2013.01); *G09G 2340/12* (2013.01)

(58) Field of Classification Search
CPC . G01C 21/3682; G01C 21/3697; G01S 19/42; G01S 5/02; G08G 1/00; G08G 1/0969; G08G 1/0965; H04M 2242/30; H04M 3/568; H04M 3/42348; G01V 1/001; H04W 4/02; H04W 64/00; G06T 17/05; G08B 13/1672; H04B 17/27
See application file for complete search history.

(56) References Cited

U.S. PATENT DOCUMENTS

| | | |
|---|---|---|
| 2002/0123840 A1 | 9/2002 | Obata et al. |
| 2005/0027448 A1 | 2/2005 | Takenaga et al. |
| 2007/0133351 A1 | 6/2007 | Taylor |
| 2009/0165140 A1* | 6/2009 | Robinson ................ G06F 21/10 726/26 |
| 2009/0181699 A1* | 7/2009 | Tysowski ................ H04M 1/56 455/457 |
| 2010/0081475 A1* | 4/2010 | Chiang ................ G06F 3/0483 455/564 |
| 2010/0094633 A1 | 4/2010 | Kawamura et al. |
| 2010/0216490 A1 | 8/2010 | Linden |
| 2010/0280826 A1* | 11/2010 | Bakish .................... G01H 9/00 704/226 |
| 2011/0106440 A1 | 5/2011 | Adradi |
| 2011/0294515 A1 | 12/2011 | Chen et al. |

\* cited by examiner

POSITION INFORMATION PROVIDING DEVICE, POSITION INFORMATION PROVIDING METHOD, POSITION INFORMATION PROVIDING SYSTEM, AND PROGRAM

CROSS-REFERENCE TO RELATED APPLICATIONS

This application is a continuation of U.S. application Ser. No. 14/606,724 filed Jan. 27, 2015, which is a continuation of U.S. application Ser. No. 13/207,729 filed Aug. 11, 2011, and claims priority under 35 U.S.C. 119 to Japanese Application No. 2010-217526, filed Sep. 28, 2010, the entire content of each of which is incorporated herein by reference.

BACKGROUND

The present disclosure relates to a position information providing device, a position information providing method, a position information providing system, and a program. Particularly, the present disclosure relates to a position information providing device, a position information providing method, a position information providing system, and a program, which provide the position information of sound.

Currently, a car navigation device is widely used which gives directions to a destination based on position information obtained using a GPS (Global Positioning System) or the like. In addition, recently, many of portable electronic devices such as a cellular phone, a portable game machine, a laptop, a camera, and the like have been equipped with a function of obtaining the position information. Accordingly, the position information is being used in various manners. In general, the position information refers to the position information of a device itself which has a function of obtaining the position information, and is provided by being superimposed on a map.

The streets overflow with a various types of sounds. When different types of sounds are heard at the same time, a situation could arise which makes it difficult to determine whether or not the sound has an influence on the hearer. Japanese Unexamined Patent Application Publication No. 2010-152107 discloses a target sound extraction device extracting a specific type of sounds from obtained sound data. Moreover, Japanese Unexamined Patent Application Publication No. 2001-174538 discloses a sound source position specifying device specifying a sound transmission position. Using these technologies would make it possible to specify the sound source position by extracting specific sounds from a flood of sounds on the streets.

SUMMARY

However, the sound source position specifying device disclosed in Japanese Unexamined Patent Application Publication No. 2001-174538 obtains information on the direction and the distance of a sound source from the device, but is not able to show information on the sound transmission position on a map. As an example of showing the information on the sound transmission position on a map, the position of an emergency vehicle or the position of a railroad crossing is superimposed on a map as the sound transmission position. In this manner, by displaying the sound transmission position on the map, accidents are likely to be reduced. Alternatively, by displaying the sound transmission position on a map, the hearing-challenged can find the position of sound using sight. In this way, there are potential demands regarding the position information of sound.

It is desirable to provide a position information providing device, a position information providing method, a position information providing system, and a program, which are new and improved ones being able to display a sound transmission position on a map to provide the information.

According to an embodiment of the present disclosure, there is provided a position information providing device including a display control portion which controls, based on sound position information showing sound data transmission positions, the display of a map display screen where icons showing the sound data transmission positions are superimposed on a map.

With this configuration, the position information of sound can be displayed on a map. The information on the sound data transmission position may be determined in the corresponding device based on the obtained sound data or may be determined by an exterior device. A user can visually ascertain the position of sound by looking at the map display screen.

The device may further include a map matching portion which specifies the sound data transmission position on the map based on the sound position information, wherein the display control portion may display the icons in the positions specified by the map matching portion.

The device may further include a sound type information obtaining unit obtaining individual sound type information showing the type of the sound data, wherein the display control portion may display the icon corresponding to the sound type information on the map display screen.

The map matching portion may specify the position of the sound data by matching the position with a target object selected based on the type of the sound data.

The map matching portion may match the position of sound data taking a vehicle as a sound source with a road, and may omit the matching processing of the sound data taking a vehicle as a sound source around a predetermined facility.

The display control portion may display an arrow showing the movement direction of the sound data transmission position on the map display screen, based on the history of the sound data transmission position.

The display control portion may display the position of an immovable object for which the sound data transmission position does not move on the map display screen, using animated icons.

When there is a plurality of the sound data items, the display control portion may display sound data transmitted from a moving object and sound data transmitted from a position close to the device on the map display screen by priority.

The device may further include an operation mode determination portion determining an operation mode according to a way of transportation of the user of the corresponding position information providing device; and a sound data obtaining portion obtaining sound data within an obtainment range according to the operation mode.

When there is an immovable object generating sound around the position information providing device, the sound data obtaining portion may obtain the sound data by orienting the directivity thereof to the direction of the immovable object.

According to another embodiment of the present disclosure, there is provided a position information providing method including obtaining sound position information showing a sound data transmission position; and displaying a map display screen where icons showing the sound data transmission positions are superimposed on a map.

According to still another embodiment of the present disclosure, there is provided a program causing a computer to function as a position information providing device including a sound position information obtaining portion obtaining sound position information showing a sound data transmission position, and a display control portion controlling the display of a map display screen where icons showing the sound data transmission positions are superimposed on a map.

According to still another embodiment of the present disclosure, there is provided a position information providing system including an analysis server having a sound position determination portion determining a sound data transmission position and a communication portion transmitting sound position information showing the transmission position; and a position information providing device having a sound position information obtaining portion obtaining the sound position information and a display control portion controlling the display of a map display screen in which icons showing the sound data transmission positions are superimposed on a map.

According to the embodiments of the present disclosure described above, the information on the sound transmission position can be provided by being displayed on a map.

DETAILED DESCRIPTION OF EMBODIMENTS

Figure 1:
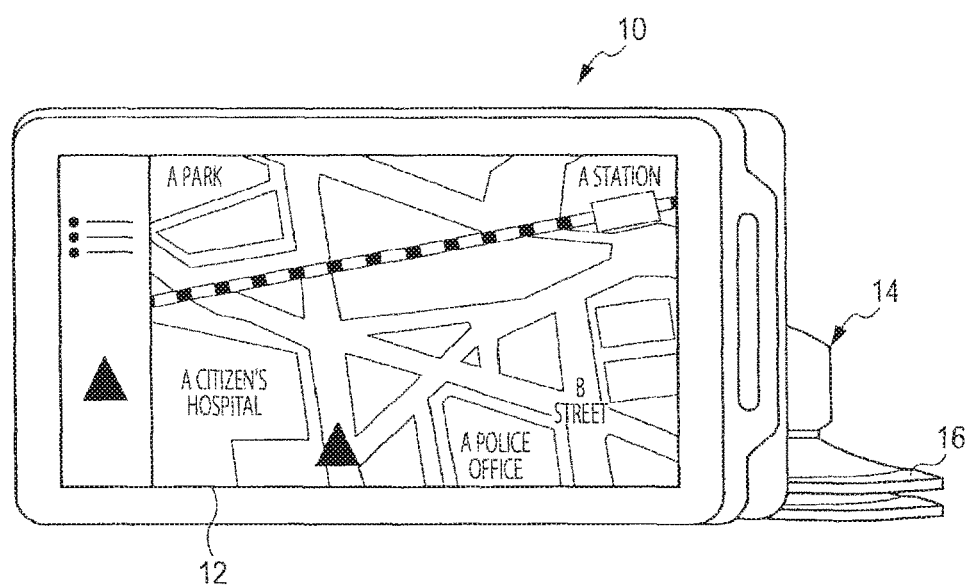
FIG. 1 is a view illustrating an example of the exterior of a PND.

Hereinafter, preferable embodiments of the present disclosure will be described in detail with reference to the attached drawings. In the present specification and drawings, constituents having substantially the same functional configuration will be marked with the same reference numerals to omit repetitive descriptions.

The description will be made in the following order.
1. First embodiment (example of executing analysis in a terminal device)
2. Second embodiment (example of executing analysis in a server)
3. Third embodiment (example of mounting the configuration on a cellular phone)

1. First Embodiment

Figure 2:
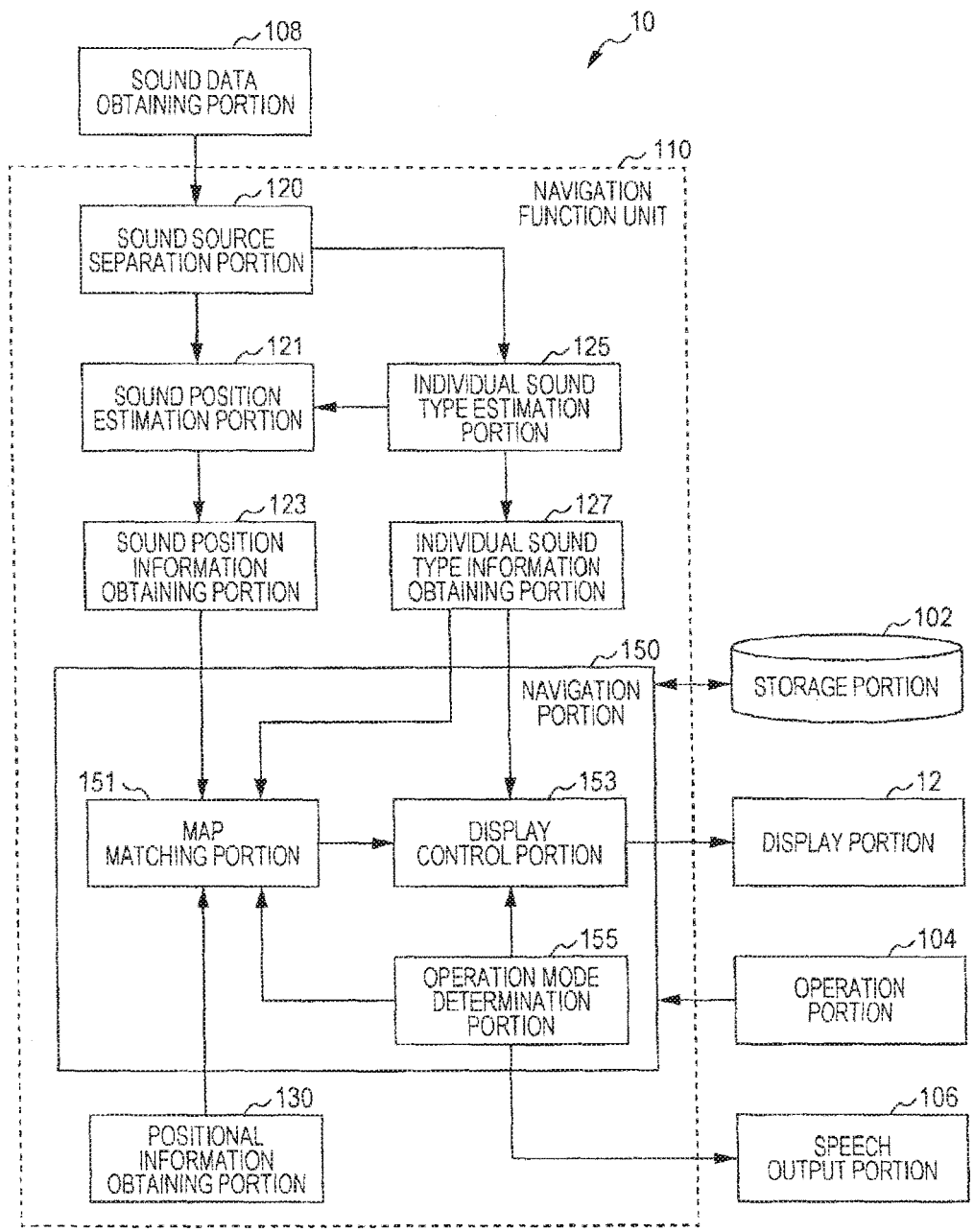
FIG. 2 is a block diagram illustrating the functional configuration of a PND according to a first embodiment.
Figure 3:
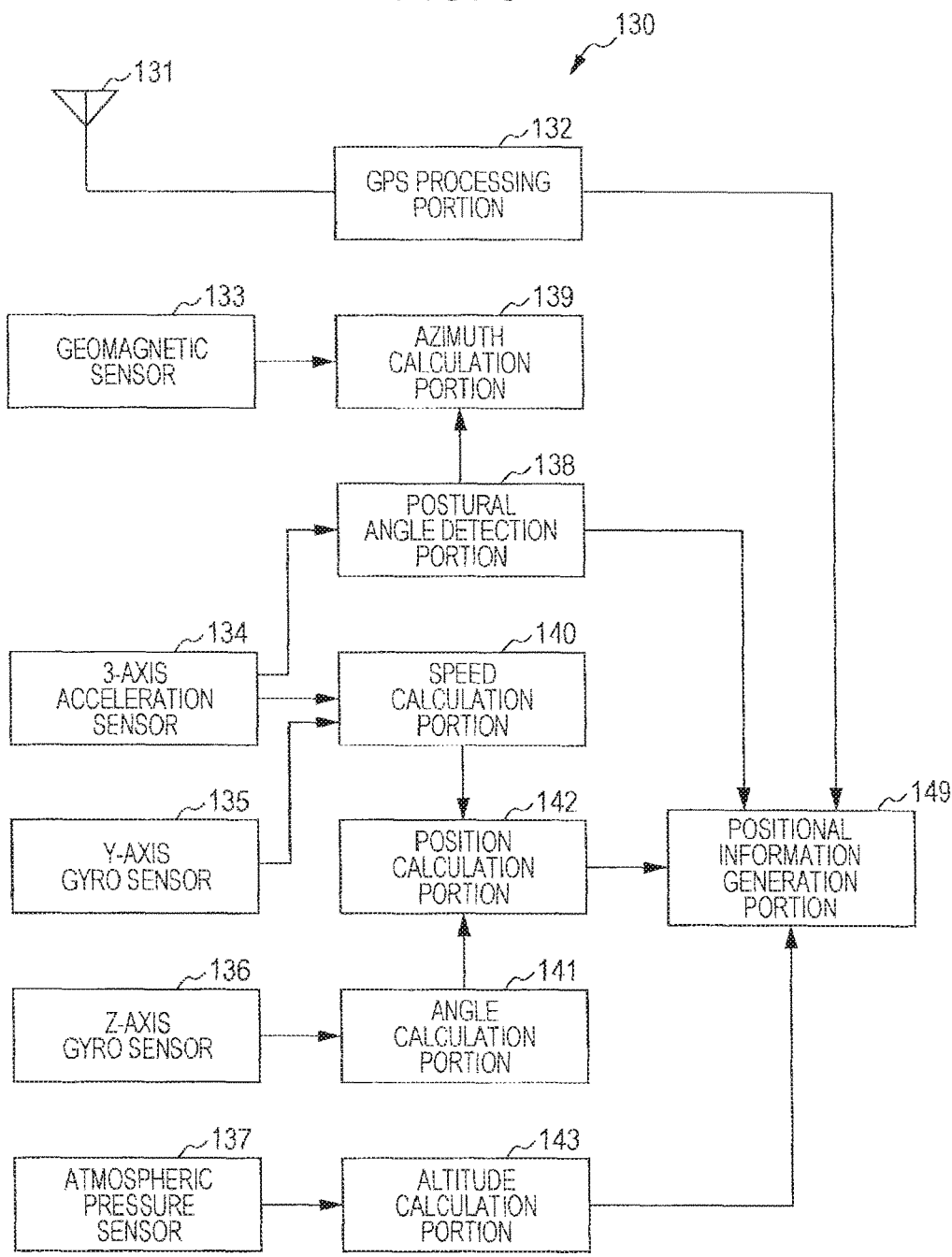
FIG. 3 is a block diagram illustrating an example of the detailed configuration of a position information obtaining portion of the PND.
Figure 4:
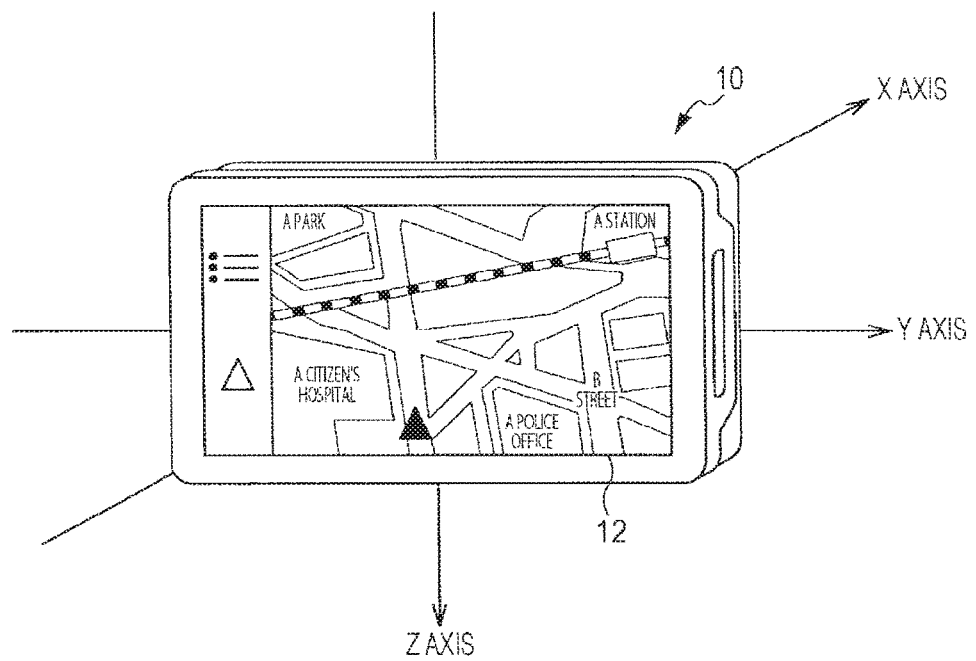
FIG. 4 is a view illustrating a coordinate system around the PND.

First, the configuration of a PND (Personal Navigation Device) which is an example of the position information providing device according to an embodiment of the present disclosure will be described with reference to FIGS. 1 to 4. FIG. 1 is a view illustrating an example of the exterior of the PND. FIG. 2 is a block diagram illustrating the functional configuration of the PND according to the first embodiment. FIG. 3 is a block diagram illustrating an example of the detailed configuration of a position information obtaining portion of the PND. FIG. 4 is a view illustrating a coordinate system around the PND.

[The Configuration of PND 10]

FIG. 1 illustrates an example of the exterior of a PND 10 which is an example of the position information providing device according to an embodiment of the present disclosure. The PND 10 has a navigation function of giving directions to a destination and a function of providing various types of information associated with the position information to a user. The PND 10 includes a display portion 12 at the front surface thereof, which is a portion for displaying images including an information providing screen providing various types of information. The case of the PND 10 is held by a cradle 14 which is provided on a dashboard of a vehicle through a sucker 16. The PND 10 can be easily attached to or detached from the cradle 14.

The PND 10 has a function of obtaining its own current position information and stores map data. Consequently, the PND 10 can superimpose the current position information on a map and cause the display portion 12 to display the position.

The functional configuration of the PND 10 will be described with reference to FIG. 2. The PND 10 mainly includes the display portion 12, a storage portion 102, an operation portion 104, a voice output portion 106, a sound data obtaining portion 108, and a navigation function unit 110.

The navigation function unit 110 mainly functions as a sound source separation portion 120, a sound position determination portion 121, a sound position information obtaining portion 123, a sound type determination portion 125, a sound type information obtaining portion 127, a position information obtaining portion 130, and a navigation portion 150. The navigation portion 150 further includes functions of a map matching portion 151, a display control portion 153, and an operation mode determination portion 155.

The display portion 12 is a display device outputting a screen where the information showing the current position has been superimposed on the map data. For example, the display portion 12 may be a display device such as a LCD (Liquid Crystal Display), an organic EL (Elecroluminescence) display, or the like.

The storage portion 102 is a storage medium storing programs for operating the PND 10, map data, and the like. For example, the storage portion 102 may be a storage medium such as a non-volatile memory including a Flash ROM (or Flash Memory), EEPROM (Electrically Erasable Programmable Read-Only Memory), EPROM (Erasable Programmable ROM), and the like; a magnetic disk including a hard disk, a disk-shaped magnetic disk, and the like; an optical disc including a CD (Compact Disc), DVD-R (Digital Versatile Disc Recordable), a BD (Blu-Ray Disc (registered trade mark)), and the like; and an MO (Magneto Optical) disc.

In the present embodiment, the storage portion 102 has a function of temporarily storing the position information and sound type information of the sound data.

The operation portion 104 receives operation instructions given by the user and outputs the contents of the operation to the navigation function unit 110. Examples of the operation instructions given by the user include destination setting, magnification or reduction of a map, voice guidance setting, and screen display setting. The operation portion 104 may be a touch screen provided integrally with the display portion 12. Alternatively, the operation portion 104 may be a physical configuration such as a button, a switch, a lever, or the like which is provided separately from the display portion 12. Furthermore, the operation portion 104 may be a signal receiving portion detecting signals showing operation signals transmitted from a remote controller by the user.

The voice output portion 106 is an output device outputting voice data and may be a speaker or the like, for example. The voice output portion 106 outputs the voice guidance used for navigation, for example. By listening to the voice guidance, the user can know the direction to a destination even if not looking at the display portion 12.

The sound data obtaining portion 108 has a function of obtaining sound data around the PND 10. For example, the sound data obtaining portion 108 is typically a sound collecting device such as a so-called microphone. The directivity of the sound collecting device may be switched between the presence and absence of the directivity. The sound data obtaining portion 108 inputs the obtained sound data to the sound source separation portion 120. When a method of determining the sound position implemented by the sound position determination portion 121 has a function of determining the sound position based on the frequency modulation caused by the Doppler effect, the sound data obtaining portion 108 may has a configuration for moving the sound collecting device closer to or away from a sound source so as to detect the frequency modulation. Alternatively, the sound data obtaining portion 108 may be able to obtain sound data from a plurality of sound collecting devices. Moreover, the sound data obtaining portion 108 is not limited only to the sound collecting device mounted on the body of the PND 10. The sound data obtaining portion 108 may be an interface for obtaining sound data from a separate sound collecting device.

The sound data obtaining portion 108 may change the sound data obtaining range according to the operation mode provided from the operation mode determination portion 155. For example, when the operation is performed in an on-board mode, since the PND 10 is considered to move faster than when the operation is performed in a walk mode, the sound data obtaining range may be set widely. When there is an immovable object generating sound, for example, a railroad crossing or the like around the PND 10, the sound data obtaining portion 108 may obtain the sound data by orienting the directivity thereof to the direction of the immovable object, based on the map data.

The sound source separation portion 120 has a function of executing a sound source separation processing for extracting voice signals corresponding to the respective sound sources from the sound data which is obtained by the sound data obtaining portion 108 and includes sounds generated from a plurality of sound sources.

The sound position determination portion 121 has a function of determining the sound data transmission position (that is, the sound source position) corresponding to the respective sound source which is provided from the sound source separation portion 120. An example of the sound position determining method of the sound position determination portion 121 includes a method in which the sound transmission position is determined based on the frequency modulation caused by the Doppler effect of the signals obtained by moving the sound collecting device closer to or away from the sound source. The sound position determination portion 121 can also generate relative position information from the PND 10.

The sound position information obtaining portion 123 has a function of obtaining the sound position information showing the sound data transmission position from the sound position determination portion 121. The sound position information obtaining portion 123 inputs the obtained sound position information to the map matching portion 151 of the navigation portion 150.

The sound type determination portion 125 has a function of determining the type of the sound data corresponding to the respective sound source which is provided from the sound source separation portion 120. The sound type determination portion 125 determines the sound type using, for example, sample data of sounds stored in advance in the storage portion 102. Examples of the sounds to be determined by the sound type determination portion 125 include sirens of emergency vehicles such as an ambulance, a patrol car, a fire truck, or the like; the sound of an electric train passing by; children's cheers; chirruping of cicadas; alert sounds of a railroad crossing; and sounds from a pedestrian traffic signal equipped with an acoustic device, and the like.

The sound type information obtaining portion 127 has a function of obtaining the sound type information showing the type of sound data from the sound type determination portion 125. The sound type information obtaining portion 127 inputs the obtained sound type information to the map matching portion 151 and the display control portion 153.

The position information obtaining portion 130 has a function of obtaining the position information showing the current position of the PND 10. The position information obtaining portion 130 has a function of obtaining the position information based on at least any one of positioning signals from a positioning satellite including the GPS (Global Positioning System), data detected by various types of sensors, the reception intensity of WiFi radio waves received from a plurality of base stations, and the distance from the base station. Herein, a configuration of using the positioning signals from the GPS and the values detected by the various types of sensors will be described using FIG. 3 for example. When the position information is obtained based on the reception intensity of WiFi radio waves from a plurality of base stations and on the distance from the base station, the position information obtaining portion 130 includes a receiver receiving the WiFi radio waves from the plurality of base stations and a current position calculation portion which determines the distance from the respective base stations from the reception intensity of the received WiFi radio waves and calculates the current position based on the principle of triangulation using the distance from the respective base stations and the position of the respective base stations.

Herein, the detailed configuration of the position information obtaining portion 130 of the PND 10 will be described with reference to FIGS. 3 and 4. The position information obtaining portion 130 mainly includes a GPS antenna 131, a GPS processing portion 132, a geomagnetic sensor 133, a 3-axis acceleration sensor 134, a Y-axis gyro sensor 135, a Z-axis gyro sensor 136, an atmospheric pressure sensor 137, a postural angle detection portion 138, an azimuth calculation portion 139, a velocity calculation portion 140, an angle calculation portion 141, a position calculation portion 142, an altitude calculation portion 143, and a position information generation portion 149.

The GPS antenna 131 can receive GPS signals from a plurality of GPS satellites and inputs the received GPS signals to the GPS processing portion 132. The received GPS signals herein include information such as orbit data showing the orbit of the GPS satellite and a transmission time of the signals.

The GPS processing portion 132 calculates the position information showing the current position of the corresponding PND 10 based on a plurality of GPS signals input from the GPS antenna 131, and provides the calculated position information to the position information generation portion 149. Specifically, the GPS processing portion 132 calculates the position of each GPS satellite from the orbit data obtained by the demodulation of each of the plurality of GPS signals, and calculates the distance between each GPS satellite and the corresponding PND 10 from the difference between the transmission time and the reception time of the GPS signals. Thereafter, the GPS processing portion 132 calculates a 3 dimensional current position based on the calculated position of each GPS satellite and the distance between each GPS satellite and the corresponding PND 10.

The geomagnetic sensor 133 has a function of detecting geomagnetism $M_x$, $M_y$, and $M_z$ in each of an X-axis direction, a Y-axis direction, and a Z-axis direction, as voltage values.

The 3-axis acceleration sensor 134 is a sensor having a function of detecting acceleration $\alpha_x$ along the X-axis, acceleration $\alpha_y$ along the Y-axis, and acceleration $\alpha_z$ along the Z-axis respectively as voltage values. The 3-axis acceleration sensor 134 detects the accelerations $\alpha_x$, $\alpha_y$, and $\alpha_z$, and inputs data showing the detected acceleration to the postural angle detection portion 138 and the velocity calculation portion 140.

As shown in FIG. 4, the Z-axis corresponds to a vertical direction, the X-axis corresponds to the movement direction of the PND 10, and the Y-axis corresponds to a horizontal direction orthogonal to the X-axis.

The Y-axis gyro sensor 135 is a sensor having a function of detecting a pitch rate $\omega_y$ which is an angular velocity on the Y-axis, as a voltage value. The Y-axis gyro sensor 135 detects the pitch rate and inputs data showing the detected pitch rate to the velocity calculation portion 140.

The Z-axis gyro sensor 136 is a sensor having a function of detecting a yaw rate $\omega_z$ as a voltage value which is a velocity (angular velocity) at which a rotation angle on the Z-axis changes while the PND 10 gyrates. The Z-axis gyro sensor 136 detects the yaw rate and inputs data showing the detected yaw rate to the angle calculation portion 141.

The atmospheric pressure sensor 137 is a sensor having a function of detecting the surrounding atmospheric pressure as a voltage value. The atmospheric pressure sensor 137 detects the atmospheric pressure and inputs data showing the detected atmospheric pressure to the altitude calculation portion 143.

The postural angle detection portion 138 performs a predetermined postural angle detection processing based on the acceleration data $\alpha_x$, $\alpha_y$, and $\alpha_z$ input from the 3-axis acceleration sensor 134 so as to generate postural angle data showing the postural angle of the PND 10, and inputs the data to the azimuth calculation portion 139.

The azimuth calculation portion 139 performs a predetermined correction processing on the geomagnetism data $M_x$, $M_y$, and $M_z$ input from the geomagnetic sensor 133, and generates azimuth data showing the azimuth of the PND 10 based on the corrected geomagnetism data and the postural angle data input from the postural angle detection portion 138. The azimuth calculation portion 139 provides the generated azimuth data to the position information generation portion 149.

That is, the geomagnetic sensor 133, the 3-axis acceleration sensor 134, the postural angle detection portion 138, and the azimuth calculation portion 139 function as a so-called electronic compass, and generate azimuth data. Mostly, when the PND 10 is detached from the cradle 14 for use (for example, when the PND 10 is used during walking), the navigation portion 150 can provide the map data displayed by being oriented to the direction of the PND 10 to the user by using the azimuth data. When used in a vehicle, the PND 10 can associate a road in the map data with the position of the vehicle from the route of the position of the vehicle, and can provide the map data oriented to the direction of the PND 10 based on the azimuth of the map, to the user. Alternatively, the PND 10 can also calculate the direction of the PND 10 from the obtained GPS azimuth, and provide the map data oriented to the direction to the user.

The velocity calculation portion 140 divides the acceleration $\alpha_z$ along the Z-axis input from the 3-axis acceleration sensor 134 by the pitch rate coy input from the Y-axis gyro sensor 135 so as to calculate a velocity V with respect to the movement direction, and inputs the calculated velocity V to the position calculation portion 142.

The angle calculation portion 141 adds a sampling cycle to the yaw rate $\omega_z$ input from the Z-axis gyro sensor 136, whereby calculating an angle θ at the time when the PND 10 gyrates, and inputs the angle data shown by the angle θ to the position calculation portion 142.

The position calculation portion 142 has a function of calculating the position information of the current position based on the velocity V calculated by the velocity calculation portion 140 and the angle θ calculated by the angle calculation portion 141. Specifically, the position calculation portion 142 determines the amount of change from the position obtained by the previous calculation to the current position, based on the velocity V and the angle θ. Then, the position calculation portion 142 calculates the current position information from the amount of change and the position of the previous time. Subsequently, the position calculation portion 142 provides the position information of the current position to the position information generation portion 149.

Based on the atmospheric pressure data input from the atmospheric pressure sensor 137, the altitude calculation portion 143 calculates the altitude of the PND 10, and provides the calculated altitude data to the position information generation portion 149.

The position information generation portion 149 generates the position information including necessary data among absolute position information provided from the GPS processing portion 132, the azimuth data of the PND 10 provided from the azimuth calculation portion 139, the position information of the PND 10 which is based on a relative position and is provided from the position calculation portion 142, and the altitude data of the PND 10 provided from the altitude calculation portion 143, and provides the generated data to the navigation portion 150.

So far, the detailed configuration of the position information obtaining portion 130 has been described using FIGS. 3 and 4. Next, the description will be continued with reference to FIG. 2.

The navigation portion 150 provides the current position information of the PND 10 by superimposing the information on the map display screen displayed on the display screen of the display portion 12. The navigation portion 150 also has a function of guiding the user when the user has set a destination, using the display screen of the display portion 12 and voice sound output from the voice output portion 106. In the present embodiment, the PND 10 provides not only the current position of the PND 10 but the information of the sound data transmission position obtained around the PND 10, on the map display screen. The detailed configuration of the navigation portion 150 for realizing the function will be described as follows. Herein, in order to describe the provision of sound data transmission position in the main, the detailed description of the navigation function will be omitted.

The map matching portion 151 has a function of correcting the position information (that is, specifying the sound data transmission position on the map) by using the map data. In general, the map matching portion 151 performs correction so that the current position of the PND 10 operating in the vehicle becomes the position on the road, using information on a road network among the map data. That is, the map matching portion 151 corrects the position by matching the current position of the PND 10 with the road. In addition to the correction function, the map matching portion 151 also has a function of correcting the sound position information provided from the sound position information obtaining portion 123.

Regarding the position information of the PND 10 itself, as long as the PND 10 is used in the vehicle, the map matching portion 151 corrects the position information by using the information on the road network, based on a premise that the PND 10 is highly likely at a place where vehicle pass, that is, on the road mainly. However, in a case of the position information of sounds, the position is not necessarily on the road. The object supposed to be a target of matching varies depending on the type of the sound. Accordingly, when correcting the sound position information, the map matching portion 151 may specify the position of the sound data by matching the position with the object selected based on the sound type information obtained by the sound type information obtaining portion 127. For example, when determining that the sound source is a vehicle such as an ambulance, a patrol car, and a fire truck based on the sound type information, the map matching portion 151 may specify the position of the sound data on the map by matching the position with the road. This matching is performed based on a premise that the vehicle is supposed to run on the road. However, for example, in a hospital, a fire station, a police station or the like, the vehicle is highly likely to be not only on the road but in the ground of the hospital, fire station, or police station. Consequently, the map matching portion 151 can omit the sound data matching processing around the predetermined facilities.

When determining that the sound source is an electric train based on the sound type information, the map matching portion 151 may specify the position of the sound data on the map by matching the position with the railway. Moreover, when the sound data is children's cheers, the map matching portion 151 may specify the position of the sound data on the map by matching the position with a park or a pedestrian traffic signal.

When the sound source is an immovable object having a fixed position, matching can be performed using the position information of the same type of immovable object on the map. For example, when the sound data is the sound of a railroad crossing, the map matching portion 151 may specify the position of the railroad crossing on the map by matching the position with the position of the railroad crossing on the map data. The same method is applied to a case of the pedestrian traffic signal equipped with an acoustic device.

There are several types of sounds of the pedestrian traffic signal equipped with an acoustic device. For example, when there is a pedestrian traffic signal equipped with an acoustic device of different directions at a single intersection, two types of sounds are generated. By determining the type of the sounds, it is possible to determine the current state of the signals from the sound data. Accordingly, in the present embodiment, the map data stored in the storage portion 102 is associated with the respective sound types of the pedestrian traffic signal equipped with an acoustic device in advance. By matching the position with the pedestrian traffic signal equipped with an acoustic device according to the sound type, the map matching portion 151 can specify the position of the sound data on the map, and can provide the information showing the state of the signal in the movement direction of the PND 10 to the display control portion 153, from the current position and the movement direction of the PND 10 (for example, based on the history of the current position).

The map matching portion 151 may change the obtainment range of the sound data subjected to the map matching, according to the operation mode of the PND 10 provided from the operation mode determination portion 155.

The display control portion 153 has a function of controlling the display of the screen displayed in the display portion 12. The display control portion 153 controls, for example, the map data stored in the storage portion 102 to be displayed mainly on the map display screen, based on the position information of the PND 10 and the sound data provided from the map matching portion 151, the information of the operation mode determined by the operation mode determination portion 155, and the operation information of the user provided from the operation portion 104.

Using the position information of the PND 10 and the sound data provided from the map matching portion 151, the display control portion 153 displays the map display screen in which icons showing the current position of the PND 10 and the position of the sound data have been superimposed on the map data. At this time, the display control portion 153 displays the icons of types (shape or pattern) according to the sound type information of the sound data on the map display screen. When the sound data transmission position is in a position within the range displayed in the map display screen, the display control portion 153 displays a screen in which the above icons have been superimposed on sites corresponding to the sound data transmission position on the map.

Based on the history of the sound data transmission position, the display control portion 153 may display an arrow showing the movement direction of the transmission position of the sound data transmitted from a moving object, near the icons associated with the target sound data. In the position information providing device providing its own current position, the display screen is not changed unless the device itself moves. Contrary to this, since the PND 10 according to the present embodiment shows the position of the sounds transmitted from the surrounding sound source, the PND 10 can provide the new pleasure that the display screen changes continuously if the position information of the sounds transmitted from a moving object is provided, even if the position of the PND 10 itself is not moved. For example, when the position of the sound data transmitted from an immovable object is provided, the display control portion 153 can provide an ever-changing screen by using animated icons.

When there are sound data transmitted from a plurality of sound sources, the display control portion 153 may determine the priority of the sound data for displaying the position on the map display screen, among the plurality of sound data items. For example, since the position of the immovable object can be found from the map data in some cases, the sound data thereof may be determined to have lower priority compared to the sound data transmitted from a moving object. Moreover, the shorter the distance between the current position of the PND 10 and the sound data transmission position, the higher the priority may be given to the data so that the data is displayed on the map display screen.

The display control portion 153 may determine whether the sound transmission position will be displayed, based on the sound type, the positional relationship between the current position of the PND 10 and the sound transmission position, and the movement direction of the PND 10. For example, when the sound type is sound of a railroad crossing, if the railroad crossing is in the direction opposite to the movement direction of the PND 10, the importance of the sound of the railroad crossing is low to the user. Therefore, the display control portion 153 may determine that the information of the sound transmission position of the railroad crossing will not be displayed. Alternatively, when the sound type is an ambulance, if the sound position of the ambulance is getting far away from the position of the PND 10, the display control portion 153 may determine that the information of the corresponding sound transmission position will not be displayed.

The operation mode determination portion 155 has a function of determining operation modes of the PND 10. For example, the operation mode determination portion 155 may determine the operation modes based on operation information that the user inputs in an operation mode switching screen by using the operation portion 104. The operation modes referred to herein may be operation modes according to the way of transportation of the user, such as an on-board mode, a walk mode, a bicycle mode, and the like. Alternatively, when a configuration is used in which the operation mode is automatically switched to the walk mode if the detachment of the PND 10 from the cradle 14 is detected, the operation mode determination portion 155 may determine the operation mode according to the information obtained by detecting the detachment.

So far, an example of the function of the PND 10 according to an embodiment of the present disclosure has been described. Each of the constituents described above may be configured using general-purpose members or circuits or may be configured by hardware specialized for the functions of each constituent. In order to perform the functions of each of the constituents, an arithmetic device such as a CPU (Central Processing Unit) may read a control program from a storage medium such as a ROM (Read Only Memory) or RAM (Random Access Memory) which stores the control program disclosing a process sequence of realizing the functions, and analyze and execute the program. Accordingly, the configuration to be used can be appropriately changed according to the technological level in each case of embodying the present embodiment.

It is possible to create a computer program for realizing each function of the PND 10 according to the present disclosure described above, and to install the program in a personal computer or the like. It is also possible to provide a recording medium which stores the computer program and can be read by a computer. The recording medium is, for example, a magnetic disk, an optical disc, a magneto optical disc, a flash memory, and the like. In addition, the computer program may be delivered through, for example, a network, without using the recording medium.

[Sound Position Information Providing Operation]

Figure 5:
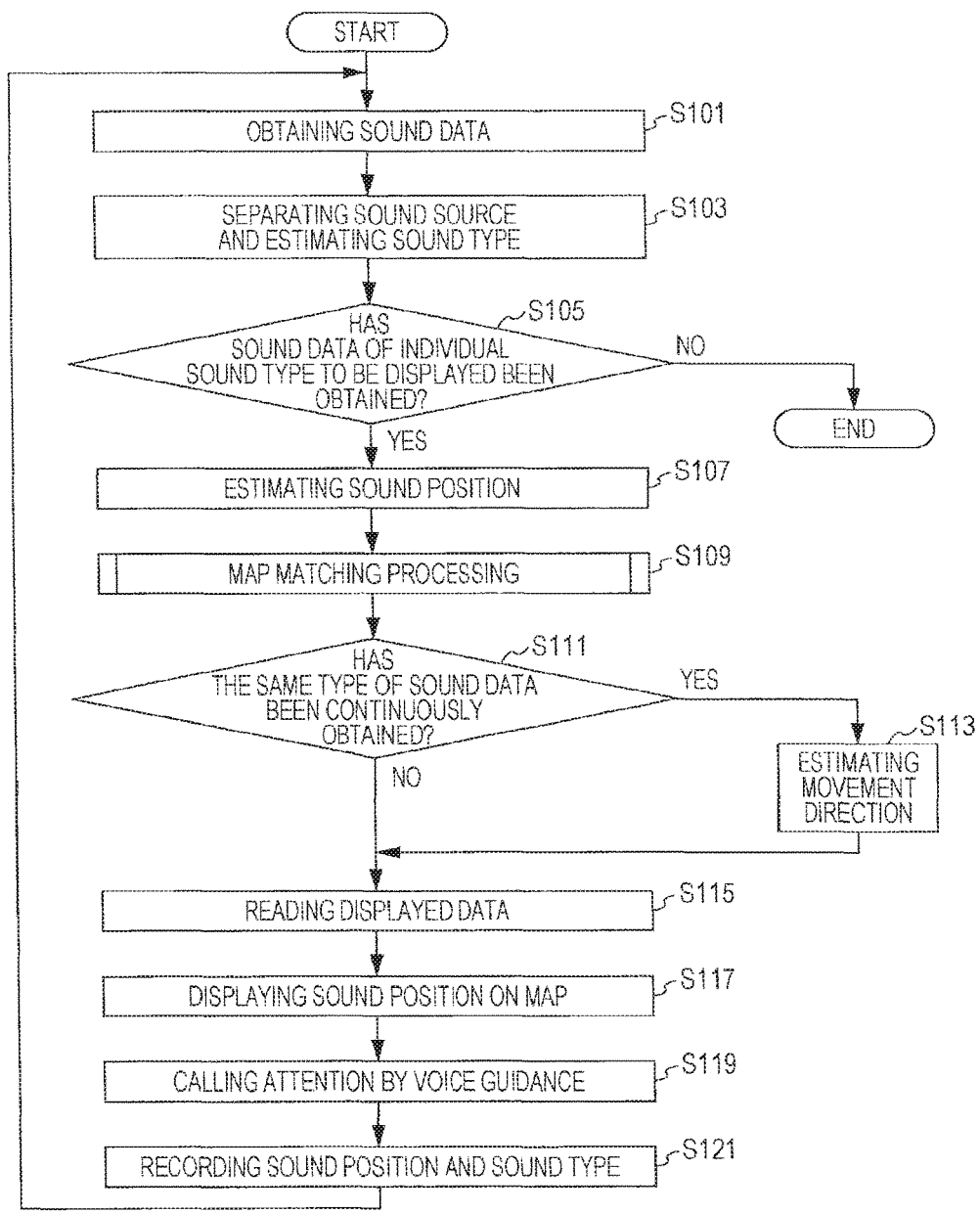
FIG. 5 is a flowchart illustrating an example of operation relating to sound position provision of the PND.

Next, the operation of the PND 10 will be described with reference to FIG. 5. FIG. 5 is a flowchart illustrating an example of the operation relating to the sound position provision of the PND according to the present disclosure.

The sound data obtaining portion 108 obtains sound data (S101). The sound data obtaining portion 108 provides the obtained sound data to the sound source separation portion 120. Herein, the provided sound data normally includes sounds from a plurality of sound sources. Consequently, the sound source separation portion 120 executes sound source separation processing in which the sound data corresponding to each sound source is extracted from the sound data. Thereafter, the sound type determination portion 125 determines the sound type of each sound data having undergone the sound source separation (S103). Herein, the sound type determination portion 125 determines whether or not the sound data which is the sound type as a display target has been obtained (S105). When the sound data which is the sound type as the display target has not been obtained, the corresponding operation ends.

When it is determined that the sound data as the display target is obtained in step S105, the sound type determination portion 125 provides the sound type information to the sound type information obtaining portion 127, and the sound type information obtaining portion 127 provides the sound type information to the map matching portion 151 and the display control portion 153. At this time, the sound position determination portion 121 determines the sound position of the sound data as the display target (S107). Then, the sound position determination portion 121 provides the determined sound position information to the sound position information obtaining portion 123, and the sound position information obtaining portion 123 provides the sound position information to the map matching portion 151.

Based on the sound position information provided from the sound position information obtaining portion 123 and the sound type information provided from the sound type information obtaining portion 127, the map matching portion 151 corrects the sound position information by matching the sound position information with an object on the map data (S109). The detail of the map matching processing executed herein will be described later with reference to FIG. 6.

As a result of determining whether or not the same type of sound data has been continuously obtained (S111), when it is determined that the same type of sound data had been obtained again at the previous time, the display control portion 153 determines the movement direction of the sound transmission position based on the history of the sound position information (S113).

Thereafter, the display control portion 153 reads display data (S115). Herein, the data to be displayed is mainly the map data, the current position information of the PND 10, the icons showing the sound transmission position, and the like. At this step, the display control portion 153 performs a process of selecting the type of the icon according to the sound type.

The display control portion 153 displays the sound position on the map (S117) and attracts attention by means of voice guidance as necessary (S119). At this time, the display control portion 153 may display an arrow showing the movement direction determined in step S113 as well as the sound transmission position. Subsequently, the displayed sound position and the sound type are stored in, for example, the storage portion 102 (S121). It is preferable that the respective steps described herein be repeated while the function of displaying the sound transmission position is performed.

So far, the operations relating to the sound transmission position provision of the PND 10 have been described. Now, the detail of map matching processing in step S109 will be described with reference to FIG. 6.

[Map Matching Processing]

First, the map matching portion 151 calculates the latitude and longitude of the sound position from the sound position information obtained by the distance and angle from an observation site, that is, the PND 10 (step S151). Thereafter, the map matching portion 151 obtains the attribute of the latitude and longitude calculated in step S151 from the map data (S153).

Subsequently, the map matching portion 151 determines whether or not the sound type is a moving object such as a vehicle or an electric train (S155). Herein, when the sound type is a moving object such as a vehicle or an electric train, the map matching portion 151 corrects the sound position information by matching the sound position information with the position of the nearest road or railroad (S157).

On the other hand, when it is determined that the sound type is not a moving object such as a vehicle or an electric train in step S155, the map matching portion 151 determines whether or not the sound type is a stationary object (which is also referred to as a immovable object) such as a railroad crossing or a traffic signal equipped with an acoustic device (S159). Herein, when it is determined that the sound type is a stationary object such as a railroad crossing or a traffic signal equipped with an acoustic device, the map matching portion 151 corrects the sound position information by matching the sound position information with the position of the nearest railroad crossing or traffic signal (S161). On the other hand, when the sound type is not any one of the objects, the sound position information not being corrected is output as a result of matching (S163).

Figure 7:
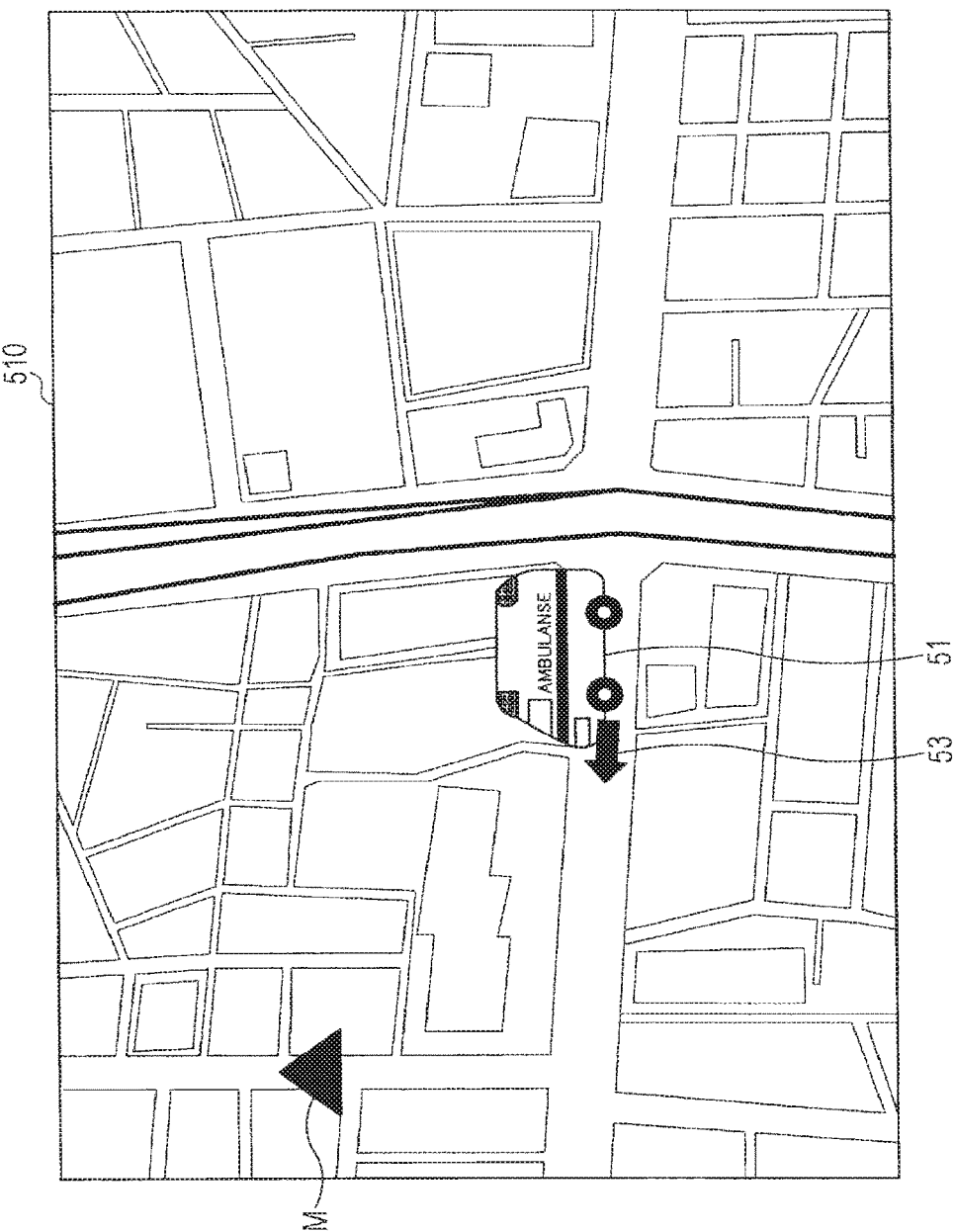
FIG. 7 is a view illustrating an example of a map display screen.
Figure 8:
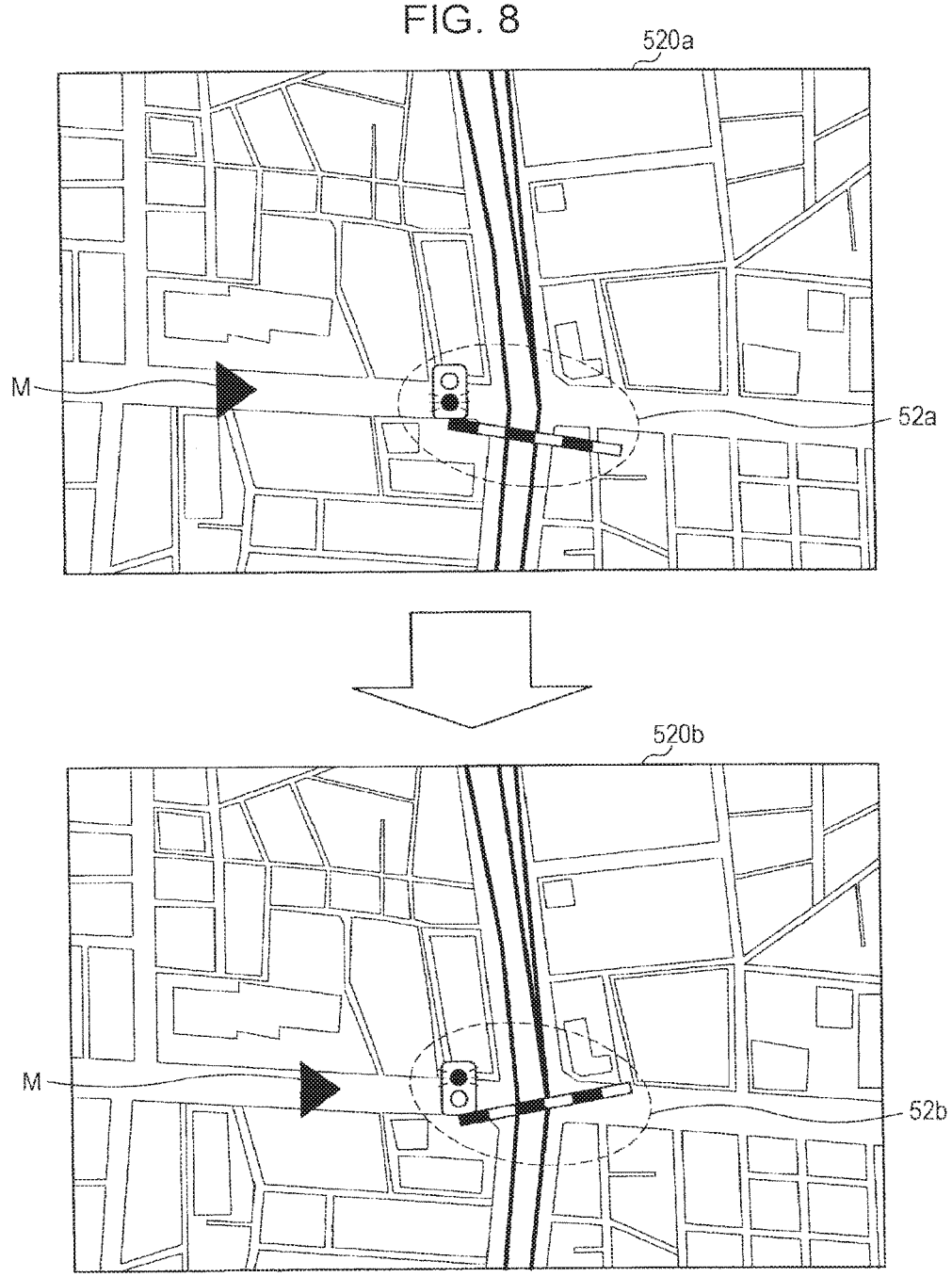
FIG. 8 is a view illustrating another example of the map display screen.

Now, the map display screen of the PND 10 will be described with reference to FIGS. 7 and 8. FIG. 7 is a view illustrating an example of a map display screen in a case where the sound type is a siren of an ambulance. FIG. 8 is a view illustrating another example of the map display screen in a case where the sound type is a sound of railroad crossing.

For example, when the sound type is the siren of an ambulance, an icon 51 showing the ambulance and an icon M showing the current position of the PND 10 are displayed. In addition, if the sound position information of the ambulance is continuously obtained, the movement direction of the ambulance as a sound source may be determined from the history of the sound position information, and the direction may be shown by an arrow 53. Furthermore, it is preferable to display an icon showing an ambulance 51 after the direction of the icon is matched with the movement direction.

FIG. 8 illustrates an example of the map display screen in a case of showing the sound position of a railroad crossing as an immovable object. When it is shown that the sound type is the sound from the immovable object, it is preferable to provide the sound transmission position by animation. For example, by alternatively displaying an icon 52*a* and an icon 52*b*, an icon 52 in a display screen 520 looks as if the icon is moving.

2. Second Embodiment

Figure 9:
FIG. 9 is a configuration view of a position information providing system according to a second embodiment.
Figure 10:
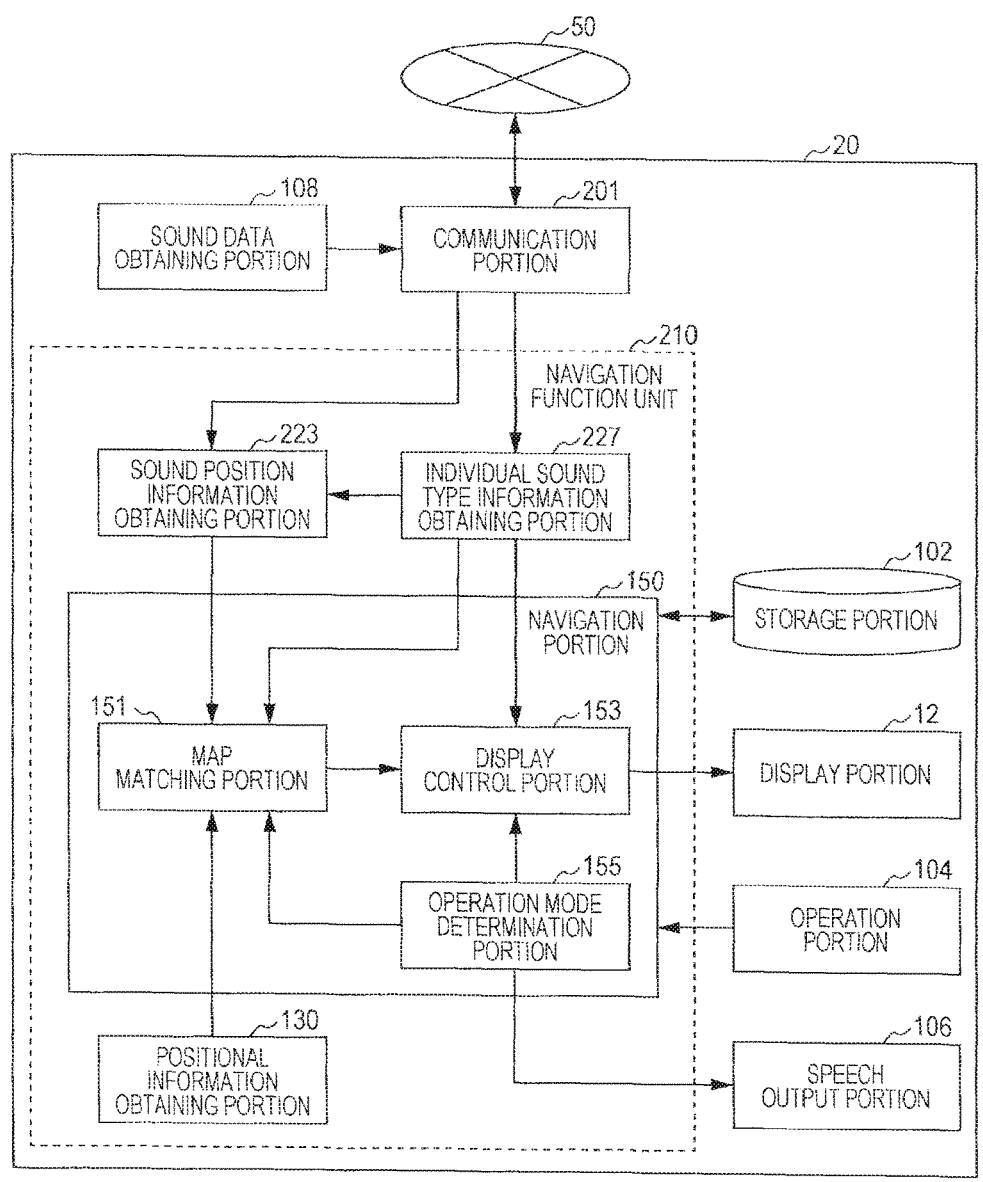
FIG. 10 is a block diagram illustrating the functional configuration of the PND according to the embodiment.
Figure 11:
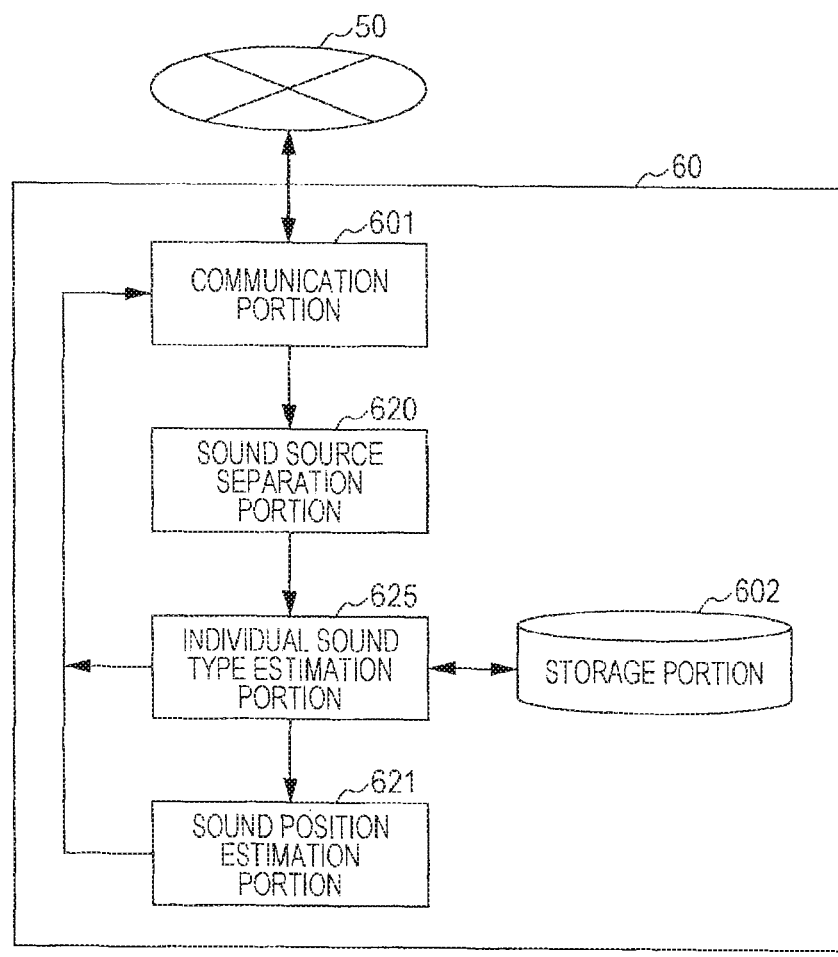
FIG. 11 is a block diagram illustrating the functional configuration of an analysis server.
Figure 12:
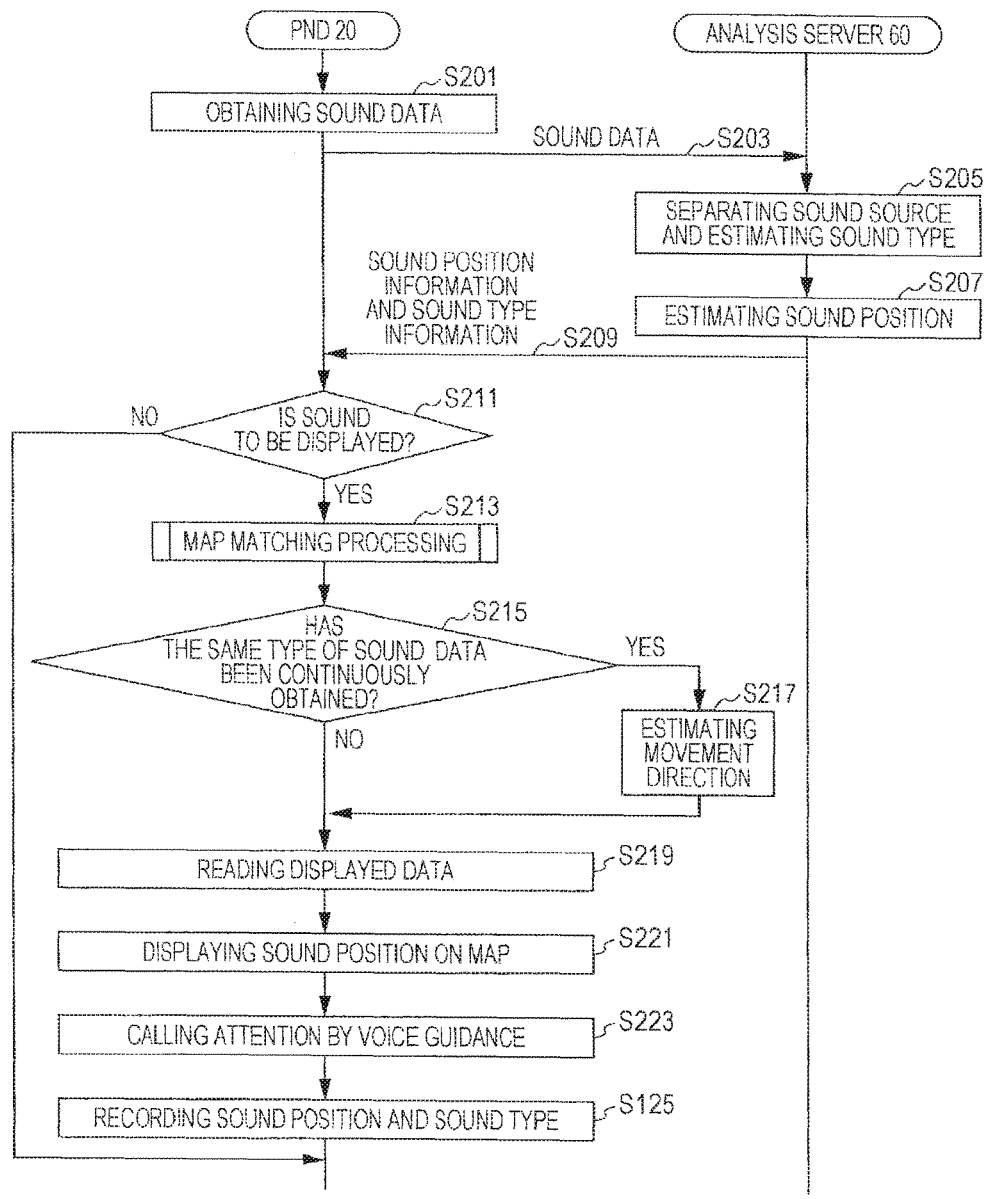
FIG. 12 is a sequence diagram illustrating an example of the operation relating to sound position provision.

Next, the position information providing system according to the second embodiment of the present disclosure will be described with reference to FIGS. 9 to 12. In the first embodiment, the process of determining the sound type and the sound position is performed in the PND 10. However, a PND 20 according to the second embodiment obtains sound type information and sound position information by using the function of an analysis server 60. FIG. 9 is a configuration view of the position information providing system according to the present embodiment. FIG. 10 is a block diagram illustrating the functional configuration of the PND according to the embodiment. FIG. 11 is a block diagram illustrating the functional configuration of the analysis server according to the embodiment. FIG. 12 is a sequence diagram illustrating an example of the operation relating to sound position provision of the position information providing system according to the embodiment.

As shown in FIG. 9, the position information providing system according to the present embodiment includes the PND 20, and the analysis server 60 connected through a network 50.

[Configuration of PND 20]

The functional configuration of the PND 20 is shown in FIG. 10. Among the respective constituents of the PND 20, the ones having the same function as the PND 10 according to the first embodiment are marked with the same reference numerals, whereby the detailed description thereof will be omitted. Hereinafter, differences of the PND 20 with respect to the PND 10 will in the main be described.

The PND 20 mainly includes the storage portion 102, the display portion 12, the operation portion 104, the voice output portion 106, the sound data obtaining portion 108, a communication portion 201, a sound type information obtaining portion 227, a sound position information obtaining portion 223, the navigation portion 150, and the position information obtaining portion 130.

For example, the communication portion 201 is a communication interface configured with a communication device for being connected to the network 50 such as the internet. For example, when the communication portion 201 performs wireless communication, the communication portion 201 may include a communication antenna for transceiving signals for the communication, a processing circuit processing various types of signals for the communication, and the like. Moreover, the communication portion 201 may be a communication interface performing wired communication. The communication portion 201 transceives various data such as sound data, position information, sound position information, and sound type information with the analysis server 60, through the network 50.

The communication portion 201 functions as a transmission portion transmitting the sound data obtained by the sound data obtaining portion 108 to the analysis server 60, and functions as a reception portion receiving sound position information and sound type information obtained from the analysis server 60. The communication portion 201 provides the received sound position information to the sound position information obtaining portion 223, and provides the obtained sound type information to the sound type information obtaining portion 227.

The sound position information obtaining portion 223 has a function of obtaining the sound position information on the sound data from a certain sound source which is included in the sound data that the sound data obtaining portion 108 obtains from the analysis server 60 through the communication portion 201. When the sound type information obtaining portion 227, which will be described next, determines that the target sound data is the sound of display target which shows the sound position information, the sound position information obtaining portion 223 provides the obtained sound position information to the map matching portion 151.

The sound type information obtaining portion 227 has a function of obtaining sound type information from the analysis server 60 through the communication portion 201. Based on the obtained sound type information, the sound type information obtaining portion 227 determines whether or not the corresponding sound data is a display target. For example, by referring to a list of sound type as the display target which is stored in advance in the storage portion 102, the sound type information obtaining portion 227 may determine whether or not the sound data is a display target based on whether or not the sound data is included in the list. When the corresponding sound data is a display target, the sound type information obtaining portion 227 provides the obtained sound type information to the map matching portion 151 and the display control portion 153.

When all of the sound data having been specified according to the sound type by the analysis server 60 are taken as the display target, the sound type information obtaining portion 227 and the sound position information obtaining portion 223 may provide all of the obtained sound type information or the sound position information to the map matching portion 151 or the display control portion 153.

[Configuration of Analysis Server 60]

Next, the functional configuration of the analysis server 60 will be described with reference to the FIG. 11. The analysis server 60 mainly includes a communication portion 601, a storage portion 602, a sound source separation portion 620, a sound type determination portion 625, and a sound position determination portion 621.

For example, the communication portion 601 is a communication interface configured with a communication device for being connected to the network 50 such as the internet. For example, when the communication portion 601 performs wireless communication, the communication portion 601 may include a communication antenna for transceiving signals for the communication, a processing circuit processing various types of signals for the communication, and the like. Moreover, the communication portion 601 may be a communication interface performing wired communication. The communication portion 601 transceives various data such as sound data, position information, sound position information, and sound type information with the PND 20, through the network 50.

The communication portion 601 functions as a reception portion receiving the sound data transmitted from the PND 20, and provides the received sound data to the sound source separation portion 620. The communication portion 601 functions as a transmission portion transmitting the sound type information provided from the sound type determination portion 625 and the sound position information provided from the sound position determination portion 621 to the PND 20.

The storage portion 602 is a storage medium storing programs for operating the analysis server 60, sample data for determining the sound type, and the like. For example, the storage portion 602 may be a storage medium such as a non-volatile memory including a Flash ROM (or Flash Memory), EEPROM (Electrically Erasable Programmable Read-Only Memory), EPROM (Erasable Programmable ROM), and the like; a magnetic disk including a hard disk, a disk-shaped magnetic disk, and the like; an optical disc including a CD (Compact Disc), DVD-R (Digital Versatile Disc Recordable), a BD (Blu-Ray Disc (registered trade mark)), and the like; and an MO (Magneto Optical) disc.

The sound source separation portion 620 has a function of executing a sound source separation processing for extracting voice signals corresponding to the respective sound sources from the sound data which is obtained from the PND 20 through the communication portion 601 and includes sounds transmitted from a plurality of sound sources.

The sound type determination portion 625 has a function of determining the type of the sound data corresponding to the respective sound source which is provided from the sound source separation portion 620. The sound type determination portion 625 determines the sound type using, for example, sample data of sounds stored in advance in the storage portion 602. Herein, examples of the sounds to be determined by the sound type determination portion 625 include sirens of emergency vehicles such as an ambulance, a patrol car, a fire truck, or the like; the sound of an electric train passing by; children's cheers; chirruping of cicadas; alert sounds of a railroad crossing; and sounds from a pedestrian traffic signal equipped with an acoustic device, and the like. The sound type determination portion 625 transmits the sound type information obtained by the determination to the PND 20 through the communication portion 601.

The sound position determination portion 621 has a function of determining the sound data transmission position (that is, the sound source position) corresponding to the respective sound source which is provided from the sound source separation portion 620. An example of the sound position determining method of the sound position determination portion 621 includes a method in which the sound transmission position is determined based on the frequency modulation caused by the Doppler effect of the signals obtained by moving a sound collecting device closer to or away from the sound source. The sound position determination portion 621 can also generate relative position information from the PND 20. The sound position determination portion 621 transmits the sound position information obtained by the determination to the PND 20 through the communication portion 601.

So far, an example of the functions of the PND 20 and the analysis server 60 according to the present embodiment has been described. Each of the constituents described above may be configured using general-purpose members or circuits or may be configured with a hardware specialized for the functions of each constituent. In order to perform the functions of each of the constituents, an arithmetic device such as a CPU (Central Processing Unit) may read a control program from a storage medium such as a ROM (Read Only Memory) or RAM (Random Access Memory) which stores the control program disclosing a process sequence of realizing the functions, and analyze and execute the program. Accordingly, the configuration to be used can be appropriately changed according to the technological level in each case of embodying the present embodiment.

It is possible to create a computer program for realizing each function of the PND 20 and the analysis server 60 according to the present embodiment described above, and to install the program in a personal computer or the like. It is also possible to provide a recording medium which stores the computer program and can be read by a computer. The recording medium is, for example, a magnetic disk, an optical disc, a magneto optical disc, a flash memory, and the like. In addition, the computer program may be delivered through, for example, a network, without using the recording medium.

[Sound Position Information Providing Operation]

Next, an example of operation regarding the sound position information provision of the position information providing system, which is realized by the PND 20 and the analysis server 60, will be described with reference to FIG. 12.

First, the PND 20 obtains the sound data by the sound data obtaining portion 108 (S201). The sound data obtaining portion 108 transmits the obtained sound data to the analysis server 60 through the communication portion 201 (S203). Then, the communication portion 601 of the analysis server 60 having received the sound data provides the received sound data to the sound source separation portion 620. The sound source separation portion 620 executes sound source separation processing in which the sound data corresponding to each sound source is extracted from the received sound data, and the sound type determination portion 625 determines the sound type of each sound data obtained by the separation (S207). Thereafter, the sound position determination portion 621 determines the sound position of the sound data for which the sound type has been determined (S207). The communication portion 601 transmits the sound type information and the sound position information obtained by the determination to the PND 20 (S209).

When the communication portion 201 of the PND 20 receives the sound position information and the sound type information from the analysis server 60, the sound type information obtaining portion 227 determines whether or not the corresponding sound data is the sound of a display target, based on the received sound type information (3211). Herein, by referring to a display target sound list which is a list stored in advance in the storage portion 102 and including the sound types of display targets, the sound type information obtaining portion 227 may determine whether or not the sound data is the sound of a display target.

Figure 6:
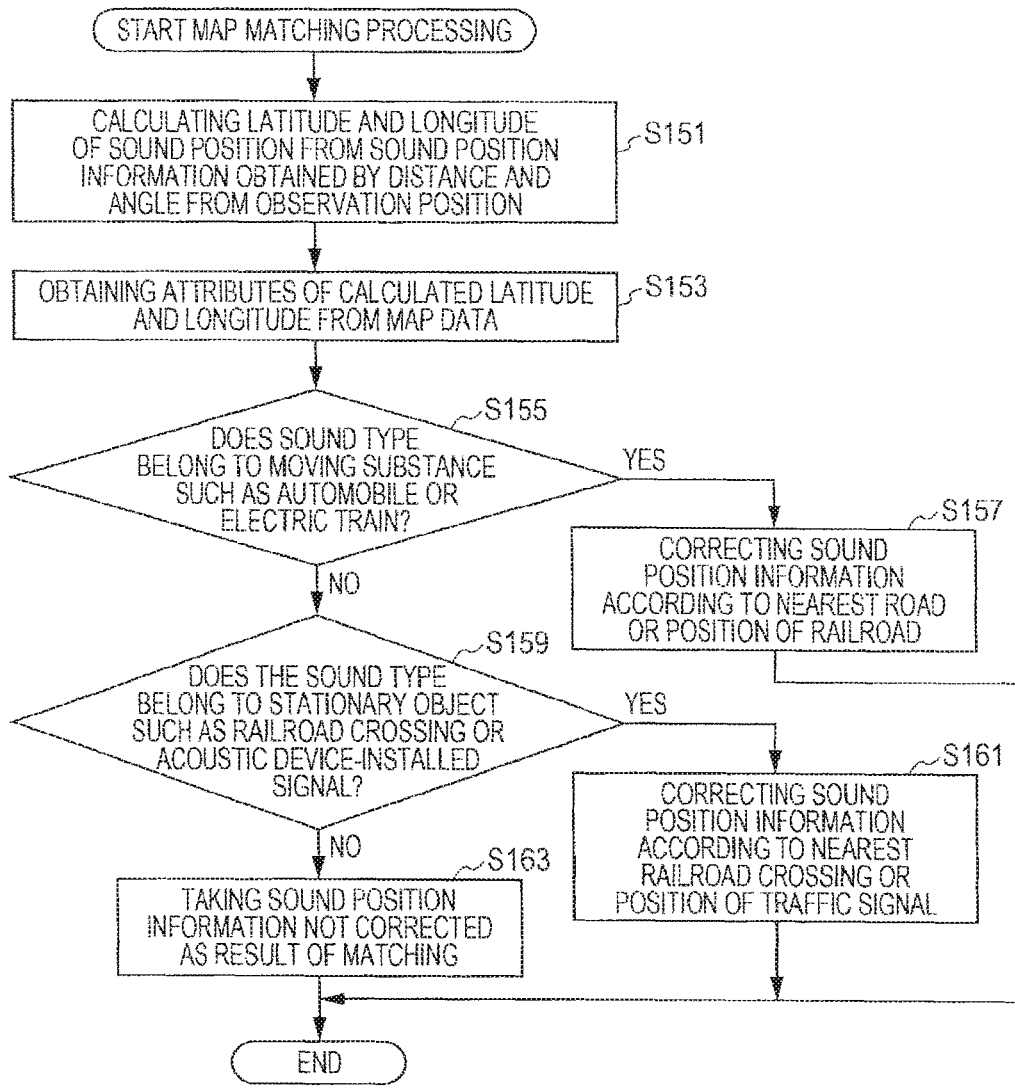
FIG. 6 is a flowchart illustrating an example of a map matching processing.

When it is determined that the sound data is the sound of a display target in step S211, the map matching portion 151 executes map matching processing in which the sound position information is corrected by being matched with a comparative object in the map data, based on the sound position information and the sound type information (S213). The map matching processing in step S213 is the same as that in the first embodiment, and the details thereof are shown in FIG. 6. Herein, the detailed description thereof will be omitted.

Next, the display control portion 153 determines whether or not the same type of sound data has been continuously obtained (S215). When the same type of sound data had been obtained again at the previous time, the movement direction of the sound transmission position is determined based on the history of the sound position information (S217).

Subsequently, the display control portion 153 reads the display data (S219). The data displayed herein is mainly the map data, the current position information of the PND 20, the icons showing the sound transmission position, or the like. The display control portion 153 performs a process of selecting the type of the icon according to the sound type in this step.

The display control portion 153 displays the sound position on the map (S221) and attracts attention by means of voice guidance as necessary (S223). At this time, the display control portion 153 may display an arrow showing the movement direction determined in step S113 as well as the sound transmission position. Subsequently, the displayed sound position and the sound type are stored in, for example, the storage portion 102 (S225). It is preferable that the respective steps described herein be repeated while the function of displaying the sound transmission position is performed.

So far, the position information providing system according to the second embodiment of the present disclosure has been described. In the present embodiment, the analysis server 60 performing the sound source separation processing, the sound type determination processing, and the sound position determination processing is used. However, the present disclosure is not limited thereto. For example, the sound source separation processing, the sound type determination processing, and the sound position determination processing may be performed by separate devices.

3. Third Embodiment

Figure 13:
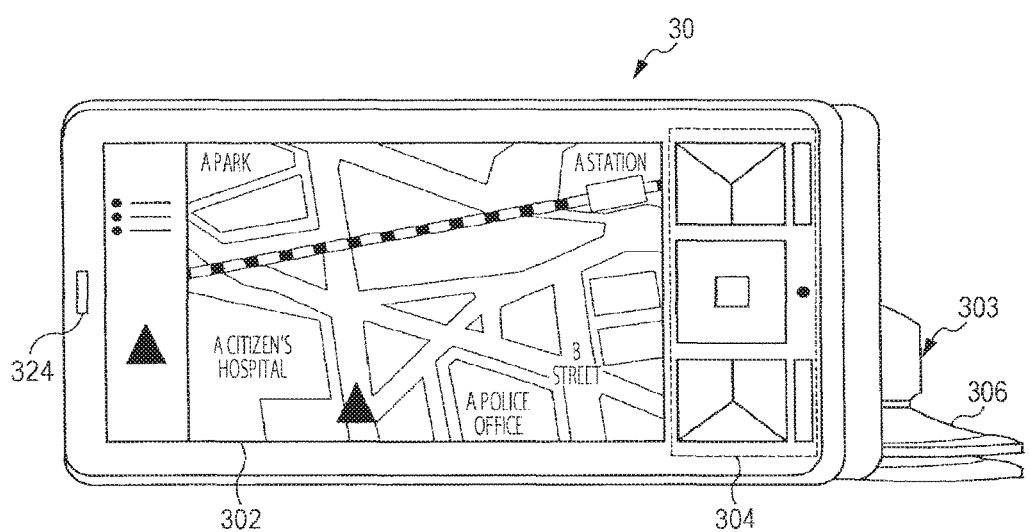
FIG. 13 is a view illustrating an example of the exterior of a cellular phone according to a third embodiment.
Figure 14:
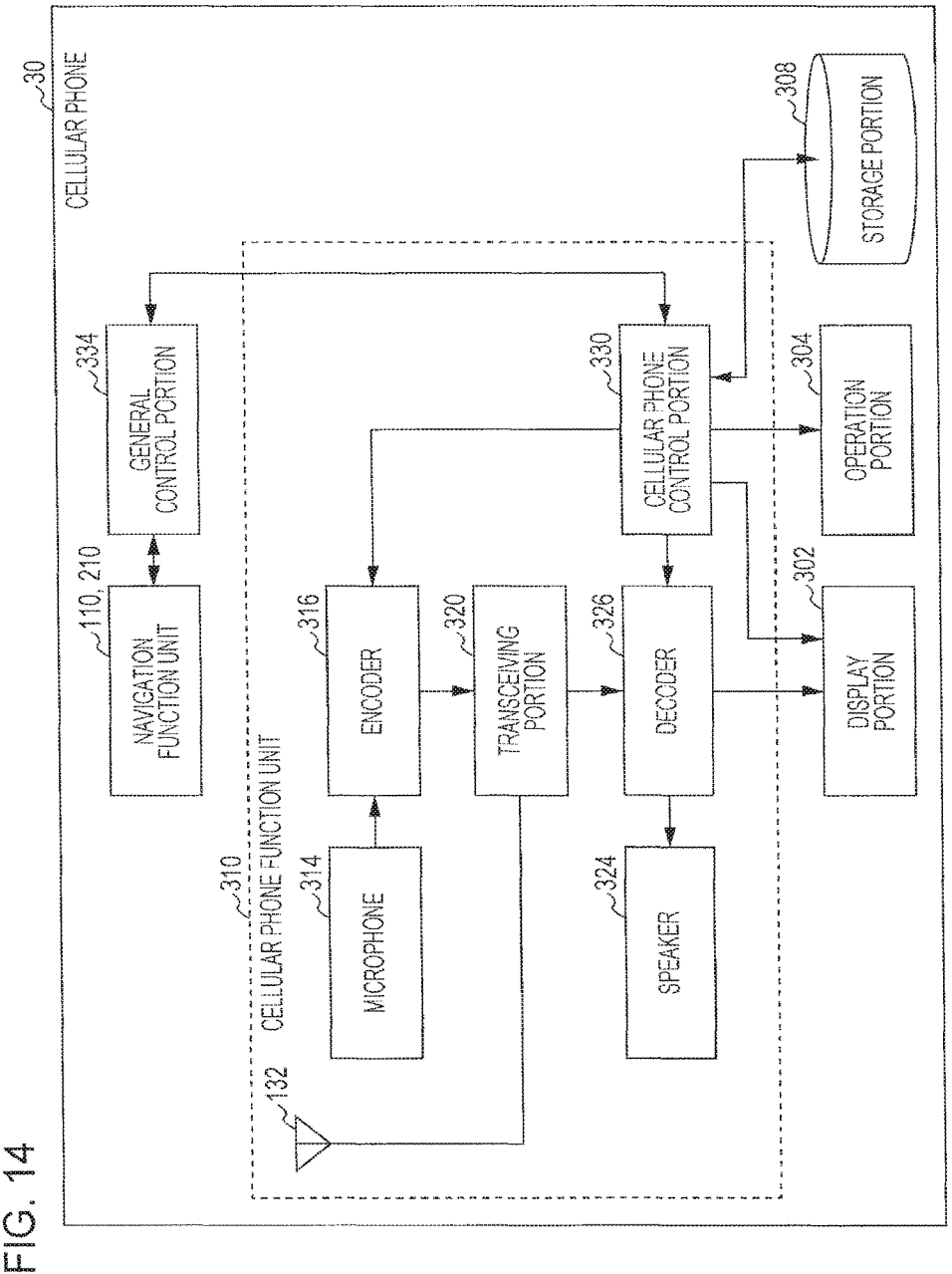
FIG. 14 is a block diagram illustrating an example of the functional configuration of the cellular phone according to the embodiment.

Next, a cellular phone 30 will be described which is the position information providing device according to the third embodiment of the present disclosure. In the above description, the position information providing device was described using the PND. However, the function of the device may be realized by a cellular phone. FIG. 13 illustrates an exterior in a case where the position information providing device is the cellular phone, and FIG. 14 illustrates the functional configuration thereof. FIG. 13 is a view illustrating an example of the exterior of a cellular phone according to the third embodiment of the present disclosure. FIG. 14 is a block diagram illustrating an example of the functional configuration of the cellular phone according to the embodiment.

As shown in FIG. 13, the cellular phone 30 according to the third embodiment includes a display portion 302, an operation portion 304, and a speaker 324. The cellular phone 30 may be installed in a vehicle by a sucker 306 through a cradle 303, just like the PND 10 according to the first embodiment.

FIG. 14 is a block diagram illustrating the functional configuration of the cellular phone 30 according to the third embodiment. As shown in FIG. 14, the cellular phone 30 according to the third embodiment includes a navigation function unit 110 or 210, the display portion 302, the operation portion 304, a storage portion 308, a cellular phone function unit 310, and a general control portion 334.

The cellular phone function unit 310 is connected to the display portion 302, the operation portion 304, and the storage portion 308. In addition, the display portion 302, the operation portion 304, and the storage portion 308 are connected respectively to the navigation function unit 110 or 210, even though the connection is briefly shown in FIG. 10. The detailed configuration of the navigation function unit 110 was described in the first embodiment by using FIG. 2, and the detailed configuration of the navigation function unit 210 was described in the second embodiment by using FIG. 10. Therefore, the description thereof is omitted herein.

The cellular phone function unit 310 is a configuration for realizing a communication function, an e-mailing function, and the like, and includes a communication antenna 312, a microphone 314, an encoder 316, a transceiving portion 320, the speaker 324, a decoder 326, and a cellular phone control portion 330.

The microphone 314 collects voice sound and outputs the voice sound as voice signals. Under the control of the cellular phone control portion 330, the encoder 316 performs digital conversion or encoding of the voice signals input from the microphone 314, and outputs voice data to the transceiving portion 320.

The transceiving portion 320 modulates the voice data input from the encoder 316 according to a predetermined method, and wirelessly transmits the modulated data to the base station of the cellular phone 30 from the communication antenna 312. In addition, the transceiving portion 320 obtains the voice data from the communication antenna 312 by demodulating wireless signals, and outputs the data to the decoder 326.

Under the control of the cellular phone control portion 330, the decoder 326 performs decoding and analogue conversion of the voice data input from the transceiving portion 320, and outputs the voice signals to the speaker 324. The speaker 324 outputs voice sound based on the voice signals provided from the decoder 326.

When an e-mail is received, the cellular phone control portion 330 provides the received data to the decoder 326 from the transceiving portion 320, and controls the decoder 326 to decode the received data. Thereafter, the cellular phone control portion 330 outputs the e-mail data obtained by decoding to the display portion 302, controls the display portion 302 to display the data, and records the e-mail data in the storage portion 308.

When an e-mail is transmitted, the cellular phone control portion 330 controls the encoder 316 to encode the e-mail data input through the operation portion 304, and wirelessly transmits the data through the transceiving portion 320 and the communication antenna 312.

The general control portion 334 controls the above-described cellular phone function unit 310 and the navigation function unit 110 or 210. For example, when there is an incoming call while the navigation function is executed by the navigation function unit 110 or 210, the general control portion 334 may temporarily switch the navigation function to the communication function of the cellular phone function unit 310. After the telephone communication ends, the general control portion 334 may control the navigation function of the navigation function unit 110 or 210 to resume navigation function.

The operation relating to the position information provision of the cellular phone 30 is the same as the first and second embodiments. Therefore, the description thereof is omitted herein.

4. Summary

So far, as preferable embodiments of the position information providing device providing information of the sound transmission position, the PND 10, the PND 20, and the cellular phone 30 have been described. In any on the embodiments, the position information providing device extracts sound data transmitted from a certain sound source from sound data obtained around the device, and provides the sound type information and the sound position information obtained by determining the type and position of the extracted sound data, by displaying the sound type information and the sound position information on the map.

Examples of the extracted sounds herein include sounds relating to traffic such as sirens of emergency vehicles including an ambulance, a patrol car, a fire truck, or the like, the sound of an electric train passing by, an alert sound of a railroad crossing, a sound of a pedestrian traffic signal equipped with an acoustic device, as well as children's cheers, chirruping of cicadas, the roar of a bear, and the like.

For example, by providing the information on the position and type of the sounds relating to traffic, it is possible to show an approaching emergency vehicle. If a user refers to this, the user can be ready for crossing the road. At this time, when the user makes a determination based on the information of sound detected by the ears, to determine whether the sound is getting closer or getting far away is the user's job. Moreover, a hearing-challenged user will have failed to obtain the information of sounds by now. However, according to the present disclosure, the information of sounds can be obtained by sight instead of hearing.

Moreover, in the past, since a device providing position information mainly provided information on the current position of the device itself, the display screen thereof was not changed unless the device itself moved. However, by providing position information and type information of sounds based on surrounding sounds which are transmitted regardless of the position information providing device itself or the user themselves, it is possible to provide a changing map display screen, and the user can enjoy visual pleasure. At this time, for example, if the position information and type information of the chirruping of cicadas are provided, the user can find where the cicadas are chirruping. When the user relied only on hearing, the user was not able to find where the cicadas were chirruping in many cases, even if he or she heard the chirruping. However, the user can search for the cicadas by referring to the position information of the sound. Alternatively, in a case of mountain roads, the position and type of the roar of a bear may be displayed. Moreover, the information on the position and type of sounds relating to weather, such as rumbling of thunder, may be provided.

When the position information of sound is displayed on the map, the map matching processing of correcting the position information using the map data is performed. However, at this time, it is possible to match the sound position not only with the road network but with the object according to the sound type. For example, if the sound of the electric train is matched with the railroad, the accuracy of the position information is highly likely to be heightened. Furthermore, if the sound is from a railroad crossing, it is preferable to match the sound with the railroad crossing. Alternatively, if the sound is from the pedestrian traffic signal equipped with an acoustic device, the sound can be matched with the traffic signal in the map data. At this time, for example, if the pedestrian traffic signal equipped with an acoustic device is at an intersection where crosswalks of two directions intersect, different sounds are set with respect to the respective directions for the signal in general. By detecting the difference of the sounds, the position information providing device can ascertain the state of the signal at the target intersection. For example, when the state of the signal in the movement direction is detected, a message for attracting attention can be provided by display or voice input.

As described above, providing the position information of sounds relating to traffic makes it possible to provide information helpful to the user in driving. Moreover, correcting the sound position by using the map data makes it possible to heighten the accuracy of the position information. In addition, since it is possible to provide the map display screen in which the display is changed even though the user does not move, the user can enjoy visual pleasure.

So far, though the preferable embodiments of the present disclosure have been described in detail with reference to the attached drawings, the present disclosure is not limited thereto. It is obvious that those skilled in the art included in the present disclosure can conceive various modifications and alterations within a technological scope disclosed in the appended claims, which is needless to say within the technological scope of the present disclosure.

For example, in the above embodiments, the first and second embodiments described a case where the position information providing device was a PND, and the third embodiment described a case where the position information providing device was a cellular phone. However, the present disclosure is not limited thereto. For example, the position information providing device may be a navigation device fixed in a vehicle and can also be applied to various devices having a function of obtaining the position information. In addition, in the above embodiments, a case was described where the position information providing device had a navigation function; however, the position information providing device does not necessarily have the navigation function. For example, the position information providing device may have a function of providing information based on the position information and map information.

In the above embodiments, as a configuration for obtaining the position information, a configuration having a positioning function based on the signals received from a GPS and a differential positioning function using various sensors was described; however, the present disclosure is not limited thereto. The position information obtaining portion may have a configuration including a receiver receiving WiFi radio waves from a plurality of base stations, and a current position calculation portion which determines the distance from the respective base stations from the reception intensity of the received WiFi radio waves and calculates the current position based on principle of triangulation using the distance from the respective base stations and the position of the respective base stations. Alternatively, a configuration may also be used which obtains positioning information using various sensors that are not shown. Moreover, as an example of a positioning satellite, a GPS was exemplified, but the present disclosure is not limited thereto. As the positioning satellite, various satellites such as Galileo, GLONASS, COMPASS, QZSS, and the like can be used. At this time, as the positioning satellite, one type of satellite may be used, or positioning signals from a plurality of types of satellites can be used in combination. According to the technological level in each case of embodying the present disclosure, the configuration used for obtaining the position information can be appropriately changed.

In the second embodiment, the analysis server 60 calculated the information on relative position of sounds, but the present disclosure is not limited thereto. It is possible that the PND 20 transmits the information of the current position of the PND 20 to the analysis server 60 together with the sound data, whereby the analysis server 60 can even perform a process of converting the information of the relative position to the information of the latitude and the longitude.

In the present specification, the steps described in the flowcharts and the sequence diagrams naturally include the processes performed in a time series manner in the described order. In addition, the steps do not necessarily include the processes performed in the time series manner, and also include processes executed paratactically or separately. Needless to say, it is possible to appropriately change the order of the steps according to circumstances even if the steps are processed in the time series manner.

The present disclosure contains subject matter related to that disclosed in Japanese Priority Patent Application JP 2010-217526 filed in the Japan Patent Office on Sep. 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
circuitry configured to:
receive sound position information, the sound position information being position information relative to an observation position at which sound is received;
determine a position of a sound source based on the sound position information and map data used to correct the sound position information; and
match the position of the sound source to a first target object on display information including a movable object when the sound source is determined to be the movable object.

2. The information processing apparatus according to claim 1, wherein the circuitry is configured to:
match the position of the sound source to a second target object on the display information including an immovable object when the sound source is determined to be the immovable object.

3. The information processing apparatus according to claim 1, wherein the circuitry is configured to:
display the display information and an icon corresponding to individual sound type information on a display screen.

4. The information processing apparatus according to claim 1, wherein the circuitry is configured to:
transmit information of the first target object and an icon corresponding to an individual sound type information.

5. The information processing apparatus according to claim 1, wherein the circuitry is configured to:
specify the position of the sound source on a display screen based on the sound position information, and
display icons in the specified position of the sound source.

6. The information processing apparatus according to claim 1, wherein the circuitry is configured to:
obtain individual sound type information showing a type of sound data, and
display an icon corresponding to the individual sound type information on a display screen.

7. The information processing apparatus according to claim 1, wherein the circuitry is configured to display, on a display screen, an arrow showing a movement direction of the sound position information on the display screen based on a history of the sound position information.

8. The information processing apparatus according to claim 1, wherein when there are a plurality of sound source items, the circuitry is configured to display, on a display screen, sound data transmitted from a moving object and sound data transmitted from a position close to the information processing apparatus on the display screen by priority.

9. The information processing apparatus according to claim 1, wherein the circuitry is configured to:

determine an operation mode according to a way of transportation of a user of a corresponding information processing apparatus; and obtain sound data within an obtainment range according to the operation mode.

10. The information processing apparatus according to claim 1, wherein when there is an immovable object generating sound around the information processing apparatus, the circuitry is configured to obtain sound data by orienting a directivity thereof to a direction of the immovable object.

11. The information processing apparatus according to claim 1, wherein the circuitry is configured to determine a display priority for a plurality of sound sources based on whether a corresponding sound source of the plurality of sound sources is the movable object or an immovable object.

12. The information processing apparatus according to claim 1, wherein a first sound source has a higher display priority than a second sound source when the first sound source is determined to be closer to the information processing apparatus than the second sound source.

13. The information processing apparatus according to claim 1, wherein a first sound source has a higher display priority than a second sound source when the information processing apparatus is determined to be moving towards the first sound source and away from the second sound source.

14. The information processing apparatus according to claim 11, wherein a higher display priority is assigned to the movable object than the immovable object.

15. An information processing method comprising:

receiving, using circuitry, sound position information, the sound position information being position information relative to an observation position at which sound is received;

determining using the circuitry, a position of a sound source based on the sound position information and map data used to correct the sound position information; and matching, using the circuitry, the position of the sound source to a first target object on display information including a movable object when the sound source is determined to be the movable object.

16. A non-transitory computer-readable storage medium storing computer-readable instructions that, when executed by a computer, cause the computer to execute a method comprising:

receiving sound position information, the sound position information being position information relative to an observation position at which sound is received;

determining a position of a sound source based on the sound position information and map data used to correct the sound position information; and matching the position of the sound source to a first target object on display information including a movable object when the sound source is determined to be the movable object.

* * * * *